(12) United States Patent
Matsumura et al.

(10) Patent No.: US 8,718,876 B2
(45) Date of Patent: May 6, 2014

(54) VEHICULAR ELECTRONIC CONTROL APPARATUS

(75) Inventors: Yasushi Matsumura, Toyota (JP); Eiichi Kamei, Nisshin (JP)

(73) Assignee: DENSO CORPORATION, Kariya (JP)

( * ) Notice: Subject to any disclaimer, the term of this patent is extended or adjusted under 35 U.S.C. 154(b) by 128 days.

(21) Appl. No.: 13/426,700

(22) Filed: Mar. 22, 2012

(65) Prior Publication Data
US 2012/0265405 A1 Oct. 18, 2012

(30) Foreign Application Priority Data

Apr. 12, 2011 (JP) .................................. 2011-87900

(51) Int. Cl.
*G06F 17/00* (2006.01)

(52) U.S. Cl.
USPC .......................................... 701/45; 701/29.1

(58) Field of Classification Search
USPC ........................................... 701/36, 45, 29.1
See application file for complete search history.

(56) References Cited

U.S. PATENT DOCUMENTS

| | | | |
|---|---|---|---|
| 2002/0099487 A1 | 7/2002 | Suganuma et al. | |
| 2005/0112940 A1* | 5/2005 | Naganishi | 439/540.1 |
| 2006/0293833 A1 | 12/2006 | Ushijima et al. | |
| 2009/0284038 A1 | 11/2009 | Sato | |
| 2011/0231032 A1 | 9/2011 | Matsumura et al. | |
| 2011/0231042 A1 | 9/2011 | Ueda et al. | |

FOREIGN PATENT DOCUMENTS

| | | |
|---|---|---|
| JP | S64-050156 A | 2/1989 |
| JP | H05-262190 A | 10/1993 |
| JP | H9-160602 A | 6/1997 |
| JP | H11-31086 A | 2/1999 |
| JP | 2002-144917 A | 5/2002 |
| JP | 2004-38388 A | 2/2004 |
| JP | 2010-126117 A | 6/2010 |
| JP | 2010-160715 A | 7/2010 |
| JP | 2010-218277 A | 9/2010 |
| JP | 2010-285001 A | 12/2010 |
| JP | 2011-201527 A | 10/2011 |

OTHER PUBLICATIONS

Office Action mailed Aug. 20, 2013 in the corresponding JP application No. 2011-087900.

* cited by examiner

*Primary Examiner* — Yonel Beaulieu
(74) *Attorney, Agent, or Firm* — Posz Law Group, PLC

(57) ABSTRACT

A vehicular electronic control apparatus includes a mother unit having a microcomputer, a plurality of ECU modules connected to the mother unit detachably and configured to execute respective vehicle controls, an operation data communication section for communicating with the microcomputer operation data used by the plurality of ECU modules in executing respective control operation processing, and alternative operation execution section for causing at least one of the other ECU modules and the microcomputer to execute, as an alternative operation, at least a part of the arithmetic operation processing, which is to be executed by at least one of the plurality of the ECU modules.

10 Claims, 7 Drawing Sheets

VEHICULAR ELECTRONIC CONTROL APPARATUS

CROSS REFERENCE TO RELATED APPLICATION

This application is based on and incorporates herein by reference Japanese patent application No. 2011-87900 filed on Apr. 12, 2011.

TECHNICAL FIELD

The present disclosure relates to a vehicular electronic control apparatus, which is mounted in a vehicle and executes various controls.

TECHNICAL BACKGROUND

Recently more and more control functions are required in a vehicle, particularly in a luxury vehicle, and a number of vehicular electronic control units (ECUs) are mounted in the vehicle to meet such requirements. The ECU is normally provided for each function or requirement. Each ECU therefore includes a microcomputer, whether the required processing capability is high or low. The microcomputer mounted in the ECU normally has its processing capability, which is higher than a maximum processing load required. The ECUs thus have excessive processing capability in total relative to a sum of the maximum processing loads, which are borne by the respective ECUs.

For a vehicle to travel safely, it is required to cooperate a steering control, a brake control and an engine control in a complicated manner. The ECUs for those controls are connected one another by a number of wire harnesses to execute communications for the cooperated functions. The ECU for the engine control or the brake control, which is important for safe travel, is provided with an additional IC or microcomputer for monitoring and detecting a failure of the microcomputer. In particular, the ECU provided for controlling the function, which needs a safety backup operation upon failure of the microcomputer, is provided with a backup circuit or a microcomputer for a fail-safe operation.

Another conventional vehicular electronic control apparatus is proposed in, for example, JP 2010-126117A. According to this vehicular electronic control apparatus, control origins such as a sensor and a steering wheel and control objects such as an engine and an air-conditioner are connected mutually by a wire harness, which includes a reconfigurable logic circuit capable of dynamically changing circuit configuration. By reconfiguring the logic circuit from time to time, processing which need not be executed concurrently is executed by sharing a common hardware.

A vehicular control system is thus complicated and large-sized, causing an increase in manufacturing cost. Contrary to a luxury vehicle, a basic vehicle is required to have only basic control functions recently. Thus, the complexity and size of the control system differ among vehicles in correspondence to a difference in the required functions. If an ECU is provided for a required function according to the conventional practice, a control system need be configured exclusively to each vehicle model thus causing an increase in development and manufacture.

According to the vehicular electronic control apparatus proposed in JP 2010-126117A, it is possible to configure a control system, which has a control function suitable for a specific vehicle model, by logically reconfiguring the connection of hardware. However, it is only a logic circuit configuration that is reconfigurable. It is not possible to readily change the hardware configuration of an entire control system, and hence cost reduction is limited.

SUMMARY

It is an object to provide a vehicular electronic control apparatus, which is capable of meeting required control functions different among vehicle models and reducing costs of development and manufacture.

A vehicular electronic control apparatus comprises a mother unit, a plurality of ECU modules and an operation data communication section. The mother unit includes a microcomputer. The plurality of ECU modules is mounted to the mother unit detachably for performing different controls for a vehicle, respectively. The operation data communication section is provided for communicating operation data, which the plurality of ECU modules uses in performing operation processing for the respective controls, with the microcomputer. In addition, an alternative operation processing section is provided for causing the communication section to transmit operation data to at least one of the microcomputer and one ECU module of the plurality of ECU modules through the microcomputer, and for causing the microcomputer or the one ECU module, to which the operation data is transmitted, to perform alternative operation processing corresponding to at least a part of operation processing, which is to be executed by another ECU module of the plurality of ECU modules.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE EMBODIMENT

A vehicular electronic control apparatus according to one embodiment will be described with reference to the accompanying drawings.

Figure 1:
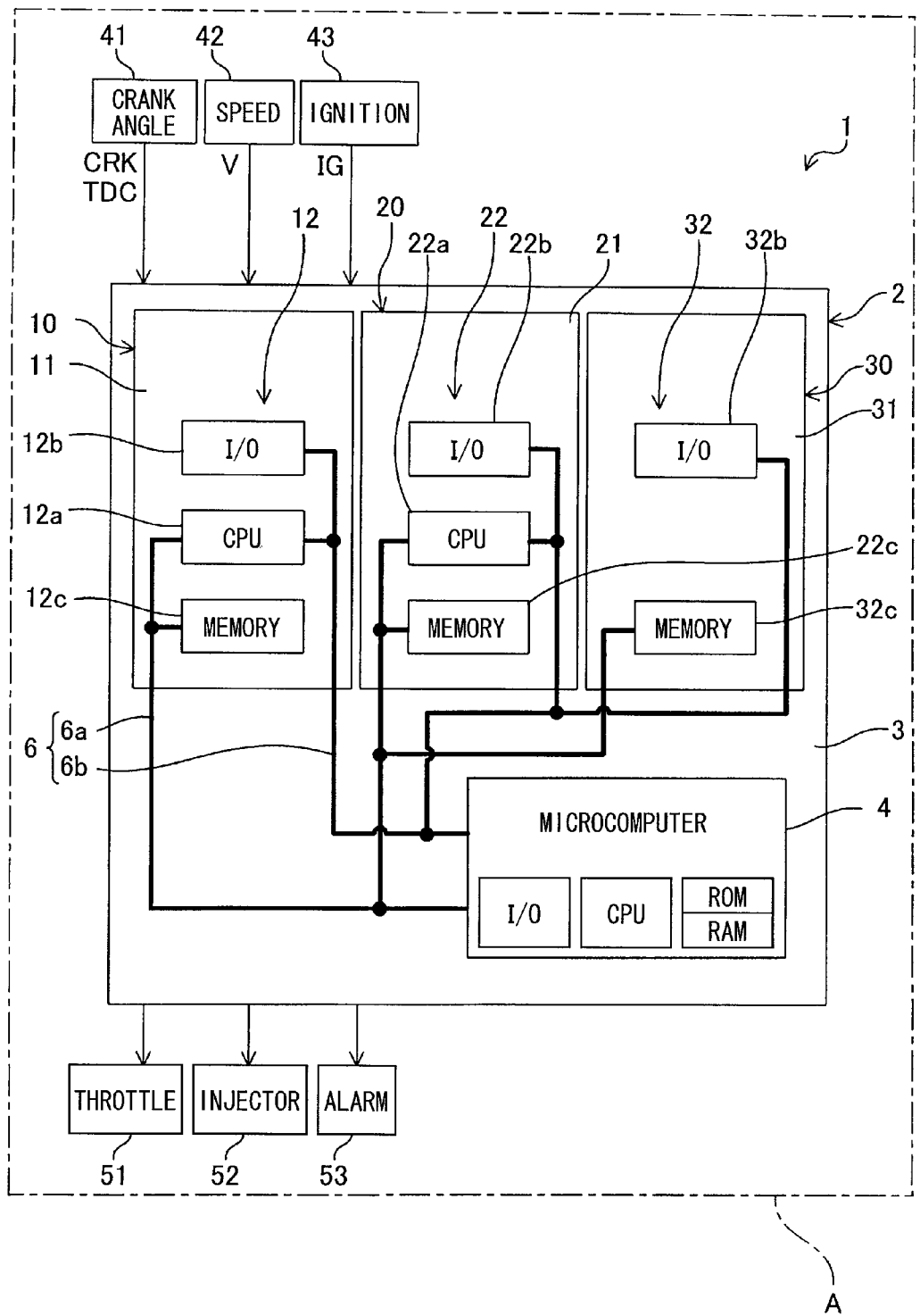
FIG. 1 is a block diagram showing a control system for a vehicle including a vehicular electronic control apparatus according to one embodiment.

Referring first to FIG. 1, a control system for a vehicle is provided with a vehicular electronic control apparatus 1. This apparatus 1 is mounted within a casing (not shown) and located at a predetermined position in a vehicle A. It includes a mother unit 2, on which a plurality of ECU modules operable with electric power supplied from a power supply source (not shown) is provided. The ECU modules include, for example, a first ECU module 10, a second ECU module 20 and a third ECU module 30.

The mother unit 2 is formed of a printed-circuit board 3 as well as a microcomputer 4 and other electronic parts mounted on the printed-circuit board 3. The microcomputer 4 is formed of a lockstep-type CPU, an I/O circuit, a ROM, a RAM and the like. The microcomputer 4 thus forms a mother ECU module, which is comparable to each of the ECU modules 10 ad 20. The CPU includes a plurality of operation sections (not shown) to ensure high reliability by performing the same arithmetic operations and the like among the plurality of operation sections concurrently, comparing the operation results and monitoring differences among the operation results.

Figure 2A:
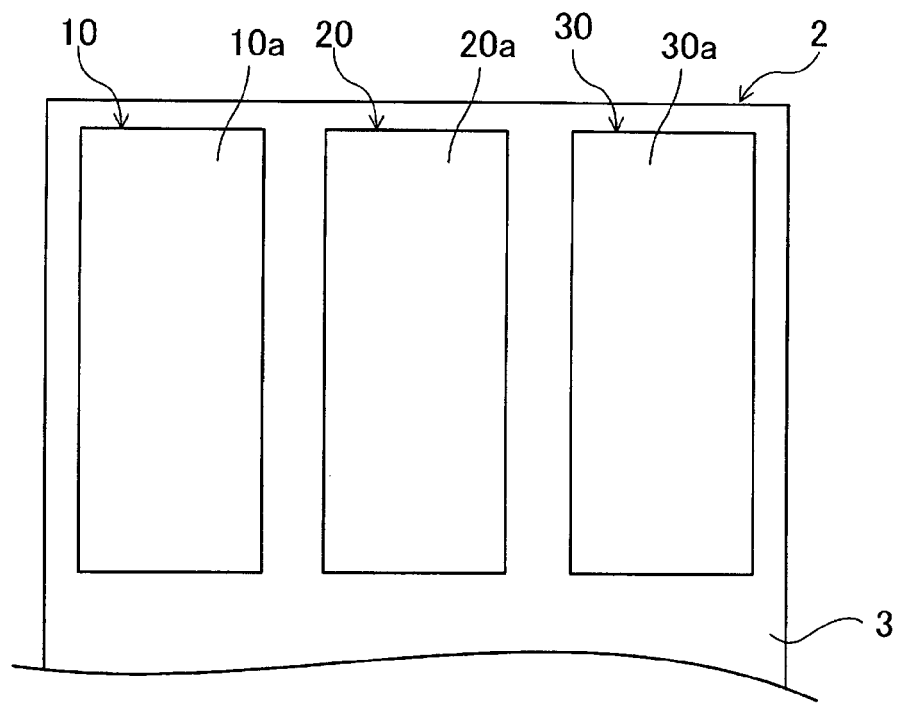
FIG. 2A is a plan view showing schematically a part of a vehicular electronic control apparatus including a plurality of ECU modules.
Figure 3A:
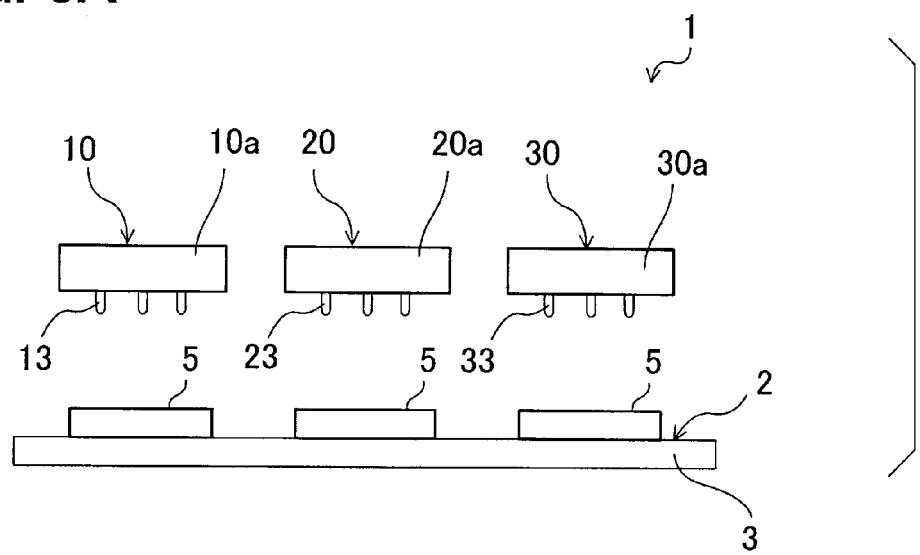
FIG. 3A is a side view showing schematically a part of the vehicular electronic control apparatus in a state before the ECU modules are mounted.
Figure 3B:
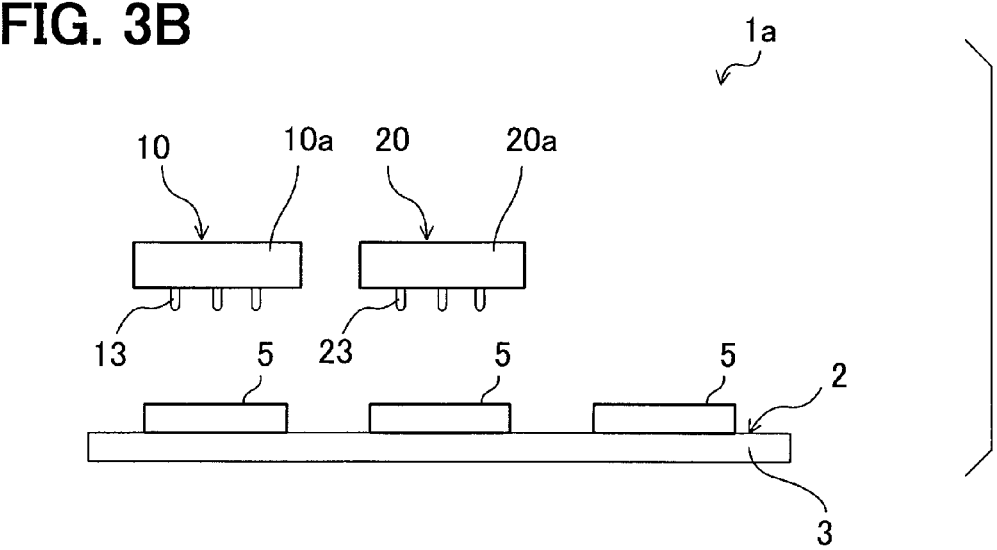
FIG. 3B is a side view showing schematically a part of the vehicular electronic control apparatus in a case that one ECU module is not mounted.

The first to the third ECU modules 10, 20 and 30 are mounted on the mother unit 2. The first ECU module 10 is provided for controlling an engine. It is formed of a printed-circuit board 11 smaller in size than the printed-circuit board 3 as well as a microcomputer 12 and other parts mounted on the printed-circuit board 11. These parts are integrated in a state accommodated within a casing 10a as shown in FIG. 2A and FIG. 3A. On one side of the printed-circuit board 11, a number of male terminals 13 are provided to protrude outwardly from the casing 10a. The male terminals 13 connect the first ECU module 10 to the mother unit 2 therethrough.

The microcomputer 12 is formed of a CPU 12a, an I/O circuit 12b and a memory 12c, which includes a ROM and a RAM. The microcomputer 12 executes operation processing for engine control by the CPU 12a based on signals inputted from various sensors through the I/O circuit 12b and operation data such as a control program stored in the memory 12c. The microcomputer 12 executes the engine control by driving various actuators through the I/O circuit 12b based on its operation results.

The second ECU module 20 is provided as a body ECU module for controlling a door lock, a headlight and the like. Similarly to the first ECU module 10, it is formed of a mother unit 21 accommodated within a casing 20a, a microcomputer 22, which includes a CPU 22a, an I/O circuit 22b and a memory 22c, and the like. The third ECU module 30 is provided as a seat ECU module for controlling a seat position and the like. It is formed of a printed-circuit board 31 accommodated within a casing 30a, a computer 32, which includes a CPU 22a, an I/O circuit 22b and a memory 22c, and the like. This computer 32 has no CPU in comparison to the microcomputers 12 and 22 in the first and the second ECU modules 10 and 20. On one sides of the printed-circuit boards 21 and 31, a number of male terminals 23 and 33 are provided, respectively.

Figure 2B:
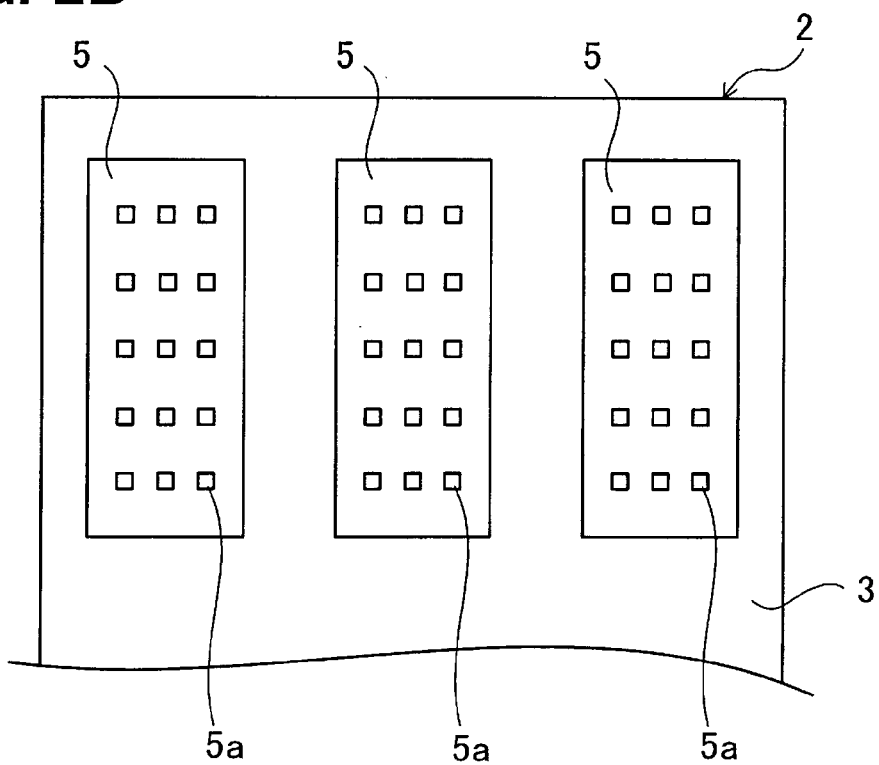
FIG. 2B is a plan view showing schematically a part of the vehicular electronic control apparatus, from which the ECU modules are not mounted.

As shown in FIG. 2B, three connectors 5 are located on the printed-circuit board 3 of the mother unit 2 to connect the first to the third ECU modules 10, 20 and 30. A number of female terminals 5a are formed in each connector 5 to receive the male terminals 13, 23 and 33 of the first to the third ECU modules 10, 20 and 30, respectively. Each ECU module is connected to corresponding connectors 5 detachably by mating of the male terminals and the female terminals.

On the mother unit 2, a communication bus 6 (operation data communication section) formed of a memory communication bus 6a and an I/O communication bus 6b is provided. Each connector 5 is electrically connected to the communication bus 6. When the ECU module is connected to the connector 5, the ECU module and the microcomputer 4 are rendered to be capable of communication mutually. It is thus made possible to mutually refer various data to each other and supply electric power for driving the ECU module from the power supply source.

The apparatus 1 is configured such that the CPU of the mother unit 2 is capable of using the I/O circuit and the memory of each ECU module through the communication bus 6 and that the CPU of each ECU module is capable of the I/O circuit and the memory of another ECU through the communication bus 6. The apparatus 1 is also configured such that the ECU modules are capable of transmitting and receiving instructions and processing data for control one another as well as transmitting and receiving data stored in the memories one another. The communication among the ECU modules is executed through the microcomputer 4.

A crank angle sensor 41 is electrically connected to the mother unit 2. The crank angle sensor 41 is formed of, for example, a magnet rotor attached to the crankshaft of an engine and a MRE pickup (all not shown). The crank angle sensor 41 outputs a CRK signal and a TDC signal, which are pulse-shaped, to the mother unit 2 in correspondence to rotation of the crankshaft.

The CRK signal is outputted at every predetermined crankshaft angular interval (for example, 1°). The CRK signal inputted to the mother unit 2 is inputted to the first ECU module 10, which performs the engine control, through the communication bus 6. The first ECU module 10 calculates a rotation speed of the engine (engine rotation speed) NE based on the CRK signal. The TDC signal indicates that a piston (not shown) of the engine is at a predetermined crankshaft angle position near a TDC (top dead center position), at which a suction stroke starts.

A detection signal indicating a vehicle travel speed V is outputted from a vehicle speed sensor 42 (parking check section) to the mother unit 2. An ignition switch 43 for staring the engine is also connected to the mother unit. A detection signal IG indicating its ON or OFF manipulation state is outputted from the ignition switch 43.

A throttle actuator (motor) 51 is provided for a throttle valve in an engine intake passage (not shown) to regulate an amount of suction air supplied to a cylinder (not shown). A fuel injection valve (injector) 52 is provided on the engine to inject fuel into a combustion chamber of the engine. An alarm light 53 is provided in an instrument panel (not shown) and is connected to the printed-circuit board 3.

The microcomputer 4 forms an alternative operation execution section, an ECU load check section, a normal operation check section, an operation processing stop section, a notification section, a backup control execution section, a parking check section, an ECU stop section, a park-time alternative control section and a data format conversion section. The detection signals inputted from the sensors 41 to 43 to the printed-circuit board 3 of the mother unit 2 are inputted to each ECU module through the communication bus 6. The microcomputer 4 and each ECU module execute the following various processing in accordance with control programs stored in respective ROMs based on the detection signals of the various sensors 41 to 43.

Figure 4:
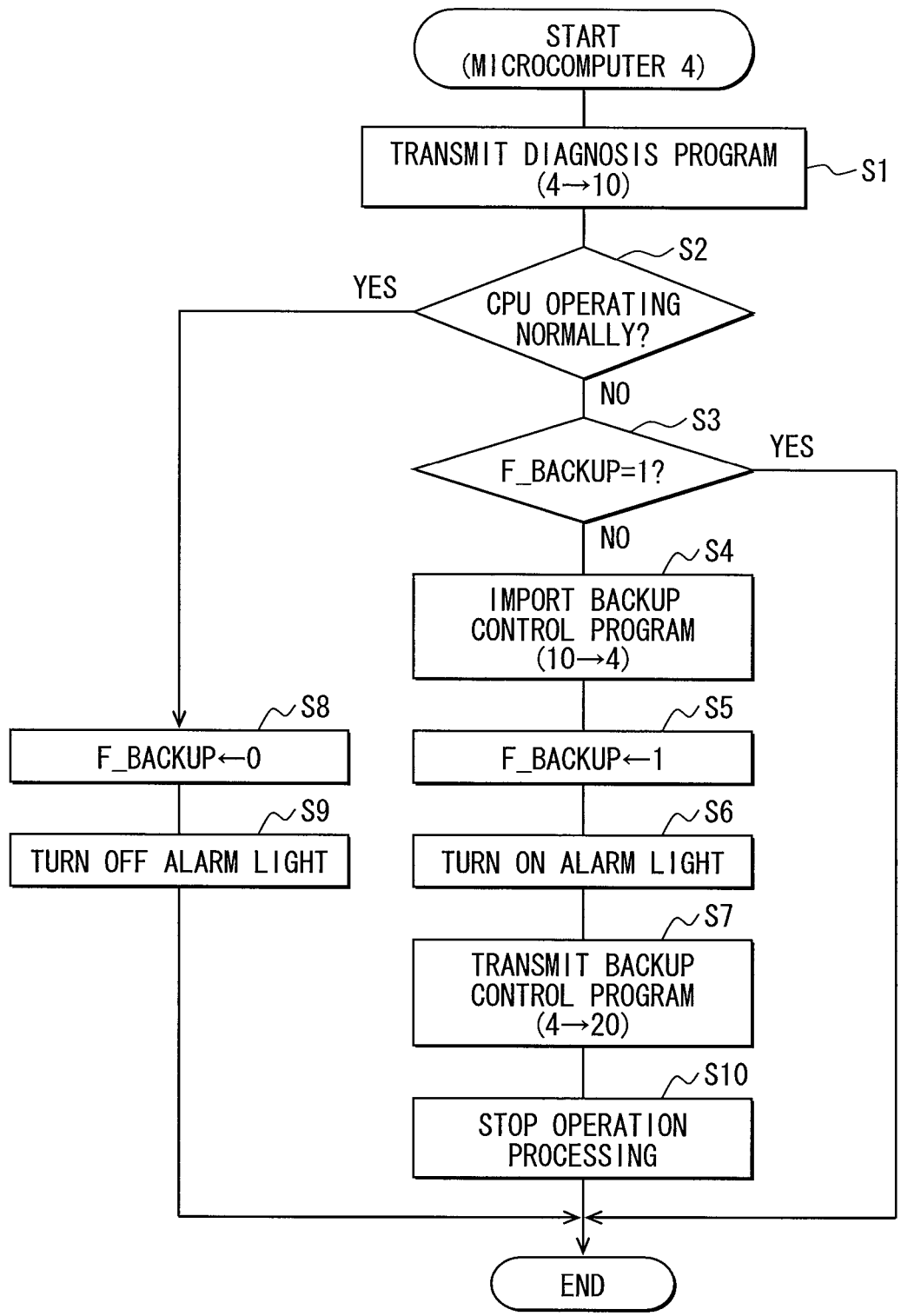
FIG. 4 is a flowchart showing ECU module diagnosis control processing.

The microcomputer 4 is configured to execute ECU module diagnosis control processing shown in FIG. 4. This processing is executed periodically at a predetermined interval. This processing is provided to check whether the first ECU module 10 for performing the engine control is operating normally and cause another ECU module to execute backup control processing described later upon determination that the first ECU module 10 is not operating normally.

At step 1 (step is shown as S in the figures), a diagnosis program for diagnosing whether the CPU 12a is operating normally is transmitted from the microcomputer 4 to the microcomputer 12 through the communication bus 6. Then it is checked (step 2), based on a result of execution of the diagnosis program by the microcomputer 12, whether the CPU 12a is operating normally.

If this check result is NO indicating that the CPU 12a is not operating normally, it is checked (step 3) whether a backup control execution flag F_BACKUP is 1. This backup control execution flag F_BACKUP is set when the backup control processing is executed as described later. If the check result at step 3 is NO indicating that the backup control processing is not executed, the backup control processing program is imported, that is, retrieved (step 4) from the memory 12c of the first ECU module 10 through the communication bus 6.

The backup control execution flag F_BACKUP is set to 1 (step 5) to indicate that the backup control processing is being executed. Then the alarm light 53 is turned on (step 6) to notify to a driver that the first ECU module 10 is not operating normally.

The backup control program imported at step 4 is transmitted (step 7) to the second module 20 and the arithmetic operation processing of the CPU 12a is stopped (step 10), thus ending this processing. With the backup control execution flag F_BACKUP being set to 1 at step 5, the check result at step 3 becomes YES in the next and the following execution times. The backup control processing is thus continued until the backup flag F is reset to 0.

If the check result at step 2 is YES indicating that the first ECU module 10 is operating normally, the backup flag F_BACKUP is reset to 0 (step 8) and the alarm light 53 is turned off (step 9), thus ending this processing.

Figure 5:
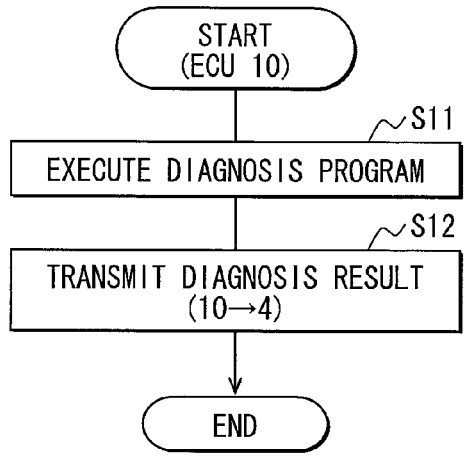
FIG. 5 is a flowchart showing diagnosis program execution processing.

The first ECU module 10 is configured to execute diagnosis program execution processing shown in FIG. 5. This processing is executed periodically at a predetermined interval to acquire data for diagnosis by the microcomputer 4 whether the CPU 12a is operating normally.

In this processing, the diagnosis program is executed at step 11. This diagnosis program has been transmitted from the microcomputer 4 at step 1 of the ECU module diagnosis control processing shown in FIG. 4. The execution result of this diagnosis program is transmitted to the microcomputer 4 (step 12), thus ending this processing.

Figure 6:
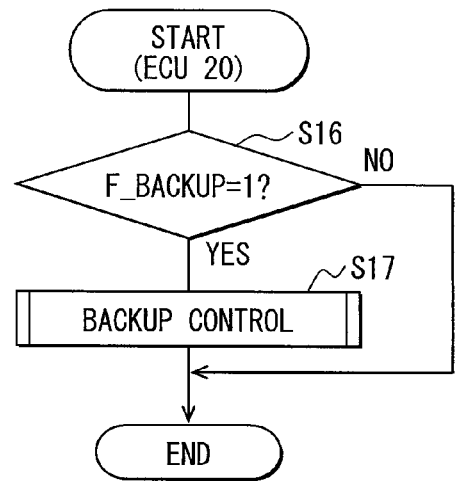
FIG. 6 is a flowchart showing backup control processing.

The second ECU module 20 is configured to execute backup control processing shown in FIG. 6. This processing is executed periodically at a predetermined interval. This processing is provided to execute a part of the arithmetic operation processing of the first ECU module 10 when the first ECU module 10 is not operating normally.

In this processing, it is first checked (step 16) whether the backup flag F_BACKUP is 1. If the check result is NO, this processing is ended. If the check result is YES, the backup control (not shown) is executed (step 17) in accordance with the backup control processing program. This backup control processing program has been transmitted from the first ECU module 10 through the microcomputer 4 in steps 4 and 7 of the ECU module diagnosis control processing.

This backup control processing is executed to at least move the vehicle to a safe location, when the CPU 12a, which is originally configured to perform the engine control, is determined to be not operating normally and the engine control cannot be performed normally. In this case, a minimum part of the engine control is executed to enable the vehicle to travel safely, by using the I/O circuit 12b of the first ECU module 10 from the CPU 22a. During the execution of such a limp-home function, the throttle actuator 51 and the injector 52 are controlled so that suction air and fuel are supplied into the cylinder of the engine in amounts corresponding to a predetermined engine rotation speed (for example, 2000 rpm).

As described above, it is checked (step 2) by the microcomputer 4 whether the first ECU module 10 is operating normally. Since an IC or a microcomputer for monitoring operation need not be provided in the first ECU module 10, the manufacturing cost of the first ECU module 10 can be reduced. If it is determined (step 2: NO) that the first ECU module 10 for the engine control is not operating normally, the minimum part of the operation processing among the entire part of the engine control, which is normally executed by the first module 10, is executed (step 17) by the CPU 22a of the second ECU module 20 in place of the first ECU module 10. This minimum part corresponds to the limp-home function, which moves the vehicle to a certain location for example.

Thus even when a failure arises in the CPU 12a for the engine control, it is possible to continue to control the vehicle A to at least travel safely by the limp-home function. Since the engine control, which the first ECU module 10 should execute, is not stopped fully, the vehicular electronic control apparatus 1 can thus have high reliability.

Although the ECU module diagnosis control processing is executed by the microcomputer 4, the diagnosis control processing may be executed by an ECU module, for example, the second ECU module 20, which is other than the first ECU module 10 to be diagnosed. The diagnosis control processing may alternatively be executed by both of the microcomputer 4 and an ECU module other than the ECU module, which is to be diagnosed.

Although the backup control processing is executed by the second ECU module 20, it may be executed by the microcomputer 4. The backup control processing may alternatively be executed by both of the microcomputer 4 and an ECU module other than the ECU module 10, which is to be diagnosed.

Figure 7:
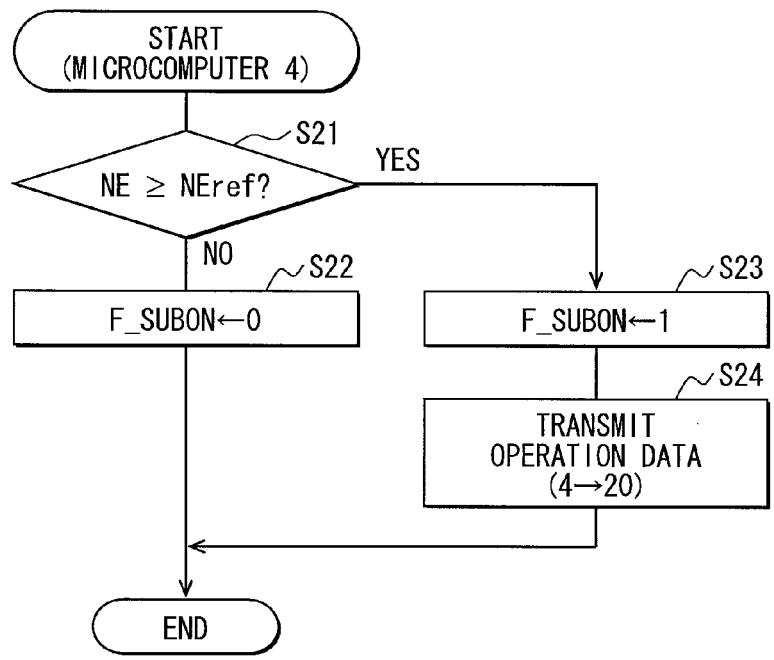
FIG. 7 is a flowchart showing alternative operation execution check processing.

The microcomputer 4 of the mother unit 2 is configured to execute alternative operation execution check processing shown in FIG. 7. This processing is executed periodically at a predetermined interval. This processing is for checking whether the engine control, which is to be executed by the first ECU module 10, should be executed fully by the first ECU module 10 in accordance with the processing load of the first ECU module 10.

In this processing, the engine state is checked first (step 21). Specifically it is checked whether the engine rotation speed NE is equal to or greater than a predetermined rotation speed NEref. The first ECU module 10 executes control of the fuel injection amount and the throttle position at each rotation of the crankshaft of the engine. The processing load of the first ECU module 10 increases as the engine rotation speed increases. If the check result at step 21 is NO, that is, the rotation speed is low, the processing load of the first ECU module 10 is small and hence all the engine control can be executed by only the processing capability of the first ECU module 10. The alternative operation execution flag F_SUBON is reset to 0 (step 22), thereby ending this processing.

If the check result at step 21 is YES, the processing load of the first ECU module 10 is great and hence the processing load of the first ECU module 10 may become deficient. The alternative operation execution flag F_SUBON is set to 1 (step 23) to indicate that a part of the entire operation processing should be borne by another ECU module. The operation data described later is transmitted (step 24) to the second ECU module 20.

Figure 8:
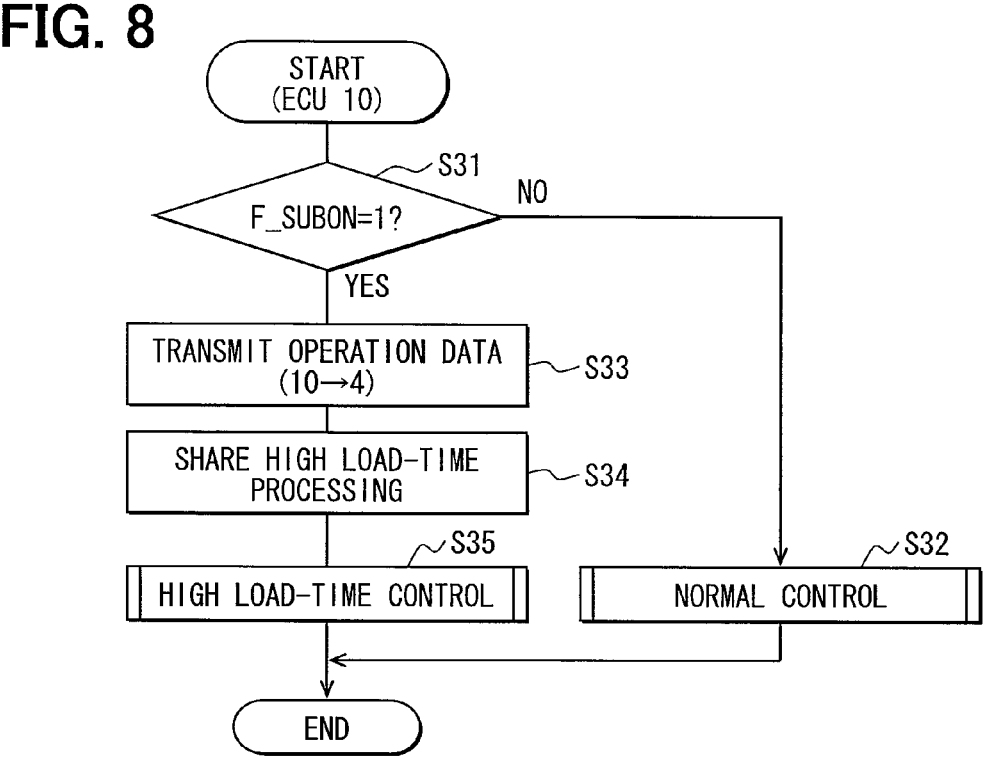
FIG. 8 is a flowchart showing engine control processing.

The first ECU module 10 is configured to execute engine control processing shown in FIG. 8. This processing is executed periodically at a predetermined interval. This processing is for execution of the normal engine control or the high processing load-time control. In the high processing load-time control executed, a part of the arithmetic operation processing, which is to be executed by the first ECU module 10 for the engine control, is borne by another ECU module.

In this processing, it is first checked (step 31) whether the alternative operation execution flag F_SUBON is 1. If this check result is NO indicating that the alternative operation processing is not necessary, normal-time control processing (not shown) is executed (step 32), thus ending this processing. Thus all the processing to be executed by the first ECU module 10 is executed with respect to the engine control.

If the check result at step 31 is YES indicating that the high processing load-time control processing should be executed, the operation data to be transmitted to the second ECU module 20 at step 24 is transmitted (step 33) to the microcomputer 4. This operation data is for a part of operation processing, which is considered to be in excess of the processing capability of the CPU 12a among all the arithmetic operation processing to be executed by the CPU 12a. That is, this operation data is for the alternative operation processing, which is to be transferred to and executed by the other ECU module.

Operation processing other than the arithmetic operation processing, which is transferred to the other ECU module for the alternative operation processing, is executed (step 34) as the high load-time shared operation. Then the fuel injection amount and the throttle position are controlled as the high processing load-time control processing (step 35) based on the operation result of step 34 and an operation result of a processing result in body control processing, engine alternative operation processing and seat alternative operation processing, thus ending this processing.

The second ECU module 20 is configured to execute body control processing, engine alternative operation processing and seat alternative operation processing. This processing is executed periodically at a predetermined interval. This processing is for executing the normal body control, a part of the seat control to be executed by the third ECU module 30 and a part of the engine control to be executed by the first ECU module 10. In this processing, the normal body control is executed (step 36).

Specifically, a door lock state and a headlight on/off state are controlled by a manipulation of a driver. The processing load of the second ECU module 20 for such body control is less than that of the high load time of the first ECU module 10 and maintained generally at a fixed level. The microcomputer 22 has sufficient processing capability relative to the processing load of the body control. Then the seat alternative operation processing is executed (step 37).

This seat alternative operation processing corresponds to the arithmetic operation processing to be executed by the third ECU module 30 and is executed alternatively by the second ECU module 20. As described above, the computer 32 of the third ECU module 30 has no CPU. The processing load for the seat control is very small. Therefore, a part of the control to be executed by the third ECU module 30 is executed alternatively by the second ECU module 20.

Specifically, at the time of starting an engine, the second ECU module 20 reads in the operation data from the third ECU module 30. In accordance with this data, the second ECU module 20 executes all the arithmetic operation processing, which is to be executed by the third ECU module 30, by using the I/O circuit 32b and the memory 32c of the third ECU module 30 through the communication bus 6.

It is checked (step 38) whether the alternative operation execution flag F=SUBON is 1. If this check result is NO, this processing is ended. If this check result is YES indicating that the engine alternative operation processing need be executed, the engine alternative operation processing is executed (step 39) based on the arithmetic operation processing data transmitted from the first ECU module 10 at steps 33 and 24. This processing is a replacement of a part of the arithmetic operation processing of the engine control. Thus, the part of the arithmetic operation processing to be executed by the first ECU module 10 is executed by using the memory 12c of the first ECU module 10 through the communication bus 6. The operation result is transmitted to the first ECU module 10 (step 40), thus ending this processing.

As described above, if it is determined that the first ECU module 10 is in the heavily-loaded state (step 21: YES), a part of the arithmetic operation processing to be executed by the first ECU module 10 is executed alternatively by the second ECU module 20. Thus, the processing load is averaged between the first and the second ECU modules 10 and 20. Thus, it is possible to set the processing capability of the microcomputer 12 mounted in the first ECU module 10 to be lower by an amount that is alternatively executed by the second ECU module 20. The total processing capability of the first and the second ECU modules 10 and 20 can be optimized relative to the processing load. The manufacturing cost of the vehicular electronic control apparatus 1 can be reduced.

Further, the third ECU module 30, which performs the seat control, is not provided with any CPU, and the arithmetic operation processing to be executed by the third ECU module 30 is executed (step 37) alternatively by the second ECU module 20. Thus, all of the arithmetic operation processing to be executed by the third ECU module 30, the processing load of which is always maintained at a low level, is executed alternatively by the second ECU module 20, which has sufficient processing capability. The manufacturing cost of the third ECU module 30 can be reduced by an amount corresponding to one CPU, which is not provided.

Although the alternative operation execution check processing described above is executed by the microcomputer 4 (mother unit 2), it may be executed by an ECU module, for example the second ECU module 20, other than the first ECU module 10, which is to be checked. It may also be executed by both of the mother unit and the ECU module other than the ECU module, which is to be checked.

Figure 9:
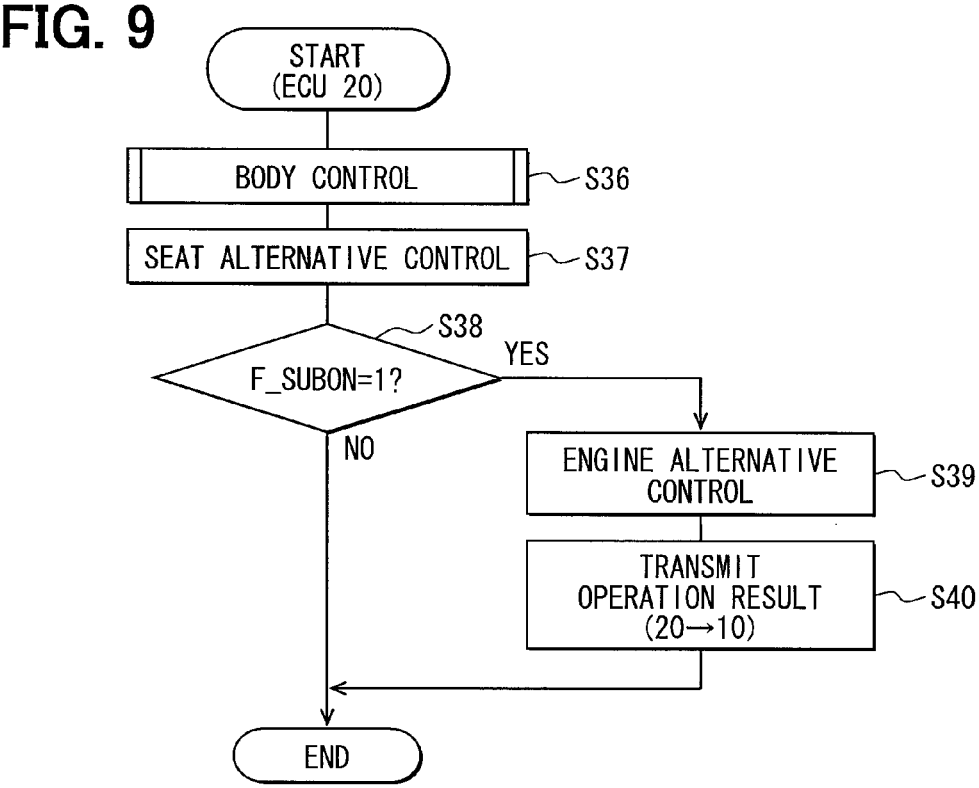
FIG. 9 is a flowchart showing body control processing, alternative engine processing and alternative seat operation processing.

Although the above-described body control, the engine alternative operation processing and the seat alternative operation processing are executed by the second ECU module 20, at least one of the engine alternative operation processing (steps 38 to 40 in FIG. 9) and the seat alternative operation processing (step 37 in FIG. 9) may be executed by the microcomputer 4. They may be executed by both of the microcomputer 4 and the ECU module other than the first and the third ECU modules 10 and 30, which are used for alternative operation processing.

Figure 10:
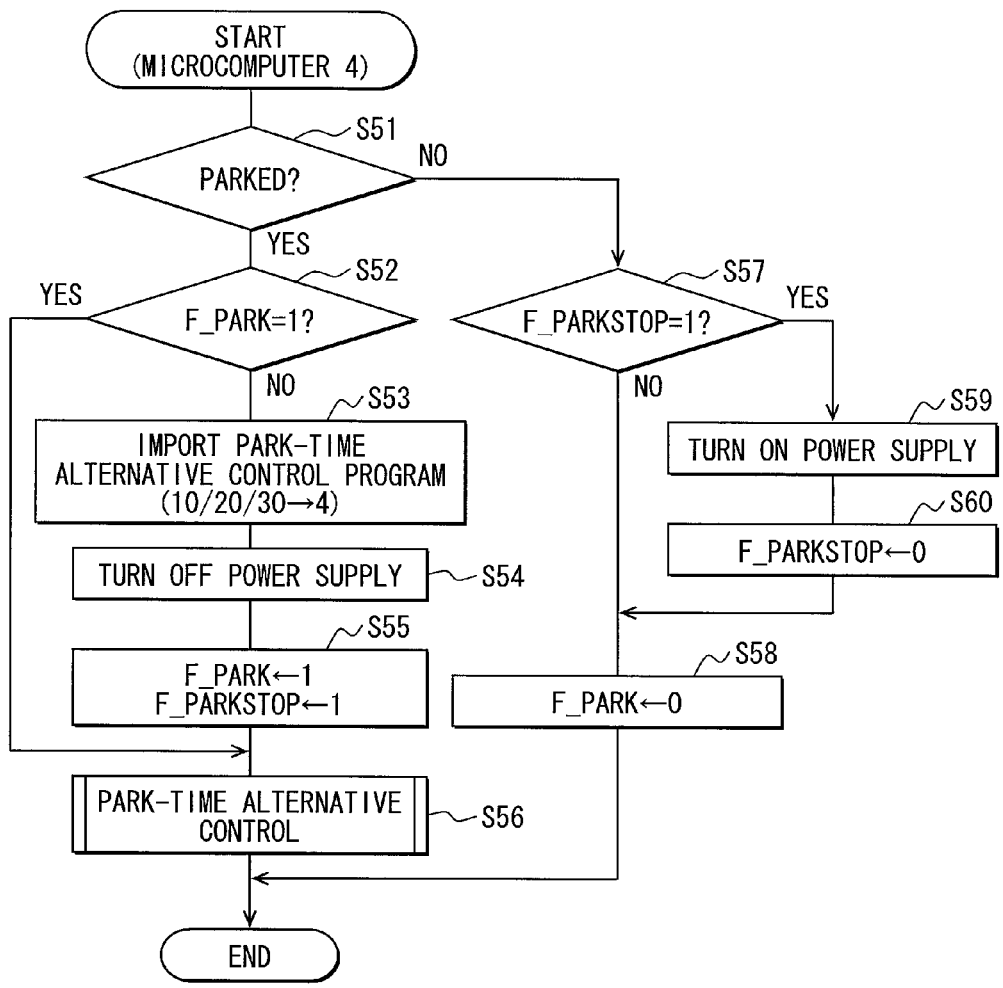
FIG. 10 is a flowchart showing park-time control processing.

The microcomputer 4 is configured to execute park-time control processing shown in FIG. 10. This processing is executed periodically at a predetermined interval. This processing is for controlling electric power supplied to each ECU module based on whether the vehicle A is parked.

It is first checked (step 51) in this processing whether the vehicle A is parked. It is determined that the vehicle A is parked when the ignition switch 43 is in the OFF state and the vehicle speed V is 0. If the check result is YES indicating that the vehicle A is in the parking state, it is checked whether a park-time control execution flag F_PARK is 1. This park-time control execution flag F_PARK is set to 1 when the park-time alternative control processing is being executed.

If the check result is NO and the park-time alternative control is not executed yet, the park-time program, which is to be executed by the first to the third ECU modules 10, 20 and 30 while the vehicle is being parked, is imported (step 53) from each ECU module. In addition, various data, which are necessary to restore the functions of the first to the third ECU modules 10, 20 and 30 when the power supply to the first to the third ECU modules 10, 20 and 30 is restarted, are imported. Then by turning off the power supply to each ECU module, each ECU module is stopped from operating (step 54).

The park-time control execution flag F_PARK is set to 1 (step 55) to indicate that the park-time alternative control processing is being executed, and a park stop flag F-PARKSTOP described later is set to 1.

In accordance with the park-time program imported at step 53, the controls, which are to be executed by the first to the third ECU modules 10, 20 and 30 during the park-time, are executed (step 56) as the park-time alternative control processing by the microcomputer 4. Then this processing is ended.

Since the park-time control execution flag F_PARK is set to 1 at step 55, the check result at step 52 becomes YES. The park-time alternative control is executed persistently until the park-time control execution flag F_PARK is reset.

If the check result at step 51 is NO indicating that the vehicle A is not parked, it is checked (step 57) whether the park stop flag F_PARKSTOP is 1. If this check result is YES and immediately after the check result at step 51 becomes NO due to turn-on of the ignition switch 43, for example, the power supply to the first to the third ECU modules 10, 20 and 30 is started (step 59). Thus each ECU module restarts its operation by using various data imported into the microcomputer 4 at step 53.

Then, the park stop flag F_PARKSTOP is reset to 0 (step 60) and the park-time control execution flag F_PARK is reset to 0 (step 58), thus ending this processing. If the check result at step 57 is NO and it is not immediately after stop of the parking state, step 58 is executed, thus ending this processing.

As described above, when it is determined that the vehicle A is being parked (step 51: YES), the power supply to each ECU module is stopped. The control, which should be executed by each ECU module during the park time, is executed by the microcomputer 4 alternatively (step 56). Thus, the controls to be executed by respective ECU modules are executed collectively by the microcomputer 4 when the vehicle A is being parked. It is thus possible to stop the power supply to the first to the third ECU modules 10, 20 and 30 and reduce power consumption of the vehicular electronic control apparatus 1.

Although the park-time control processing described above is executed by the microcomputer 4, it may be executed at the ECU module side, for example, by the second ECU module 20. In this case, the power supply to the second ECU module 20 need be maintained even during the park time. It is also possible to execute the park-time control processing by both of the microcomputer 4 and any one of the ECU modules.

Figure 11:
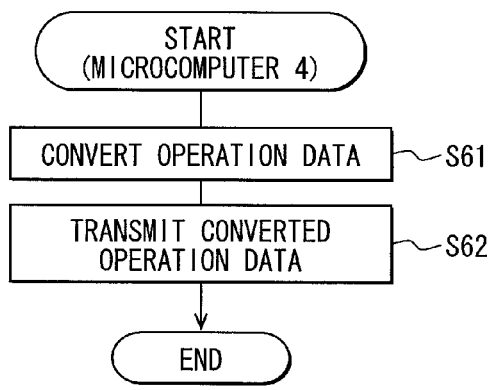
FIG. 11 is a flowchart showing data format conversion processing.

The microcomputer 4 is further programmed to execute data format conversion processing shown in FIG. 11. This processing is executed periodically at a predetermined interval. This processing is for converting the data format of operation data in case of transmission to the other ECU modules so that such operation data my be readily used by the other ECU modules. The operation data is outputted from any one of the ECU modules or the microcomputer 4 for execution of the control by each ECU module and includes programs and various signals, which are used for the arithmetic operation processing.

In this processing, the data format of the inputted operation data is converted, so that it may be usable at the ECU module to which the data is transmitted. The ROM of the microcomputer 4 pre-stores, for example, a format of operation data such as programs and control signals used in executing controls in respective ECU modules as well as a table, which defines a correspondence between a pre-conversion data and a post-conversion data. With reference to the conversion table, the data format is converted in correspondence to the ECU module at the transmitting side and the ECU module at the receiving side.

The operation data, which has been converted to be usable by the ECU module at the receiving side, is transmitted (step 62), thus ending this processing.

As described above, in case of communication of the operation data between the ECU modules through the microcomputer 4, the operation data is converted into the data format, which is usable in the ECU module at the receiving side. For example, in case of sharing the arithmetic operation processing by the second ECU module 20 when the first ECU module 10 has a heavy processing load, the operation data transmitted from the first ECU module 10 is converted by the microcomputer 4 into the data format, which is usable by the second ECU module 20. In case of returning operation data produced in the second ECU module 20 to the first ECU module 10, such operation data is also converted in format to be usable in the first ECU module 10.

Thus, even in case that the first to the third ECU modules 10, 20 and 30 are manufactured by different manufacturers and the data format of the operation data used in respective ECU modules are different one another, difference in the data format can be eliminated by format conversion processing of the microcomputer 4. Thus controls among the first to the third ECU modules 10, 20 and 30 can be cooperated one another.

Although the data format conversion processing described above is executed by the microcomputer 4, it may be executed by the ECU module side. For example, it is possible to execute it by the existing ECU module such as the second ECU module 20 or by an ECU module, which is provided exclusively for the data format conversion. In this case, the operation data is transmitted and received through the ECU module provided exclusively for the data format conversion function. It is also possible to execute the data format conversion by both of the microcomputer 4 and the ECU module. In case that the arithmetic operation processing such as the park-time control processing is executed by the microcomputer 4, the operation data is converted in format to be usable in the microcomputer 4.

According to the vehicular electronic control apparatus 1, the first to the third ECU modules 10, 20 and 30 are connected detachably to the mother unit 2, and the operation data necessary for the arithmetic operation processing are transmitted to and received from the microcomputer 4 of the mother unit 2. Each ECU module can therefore control the control objects such as the engine and the headlight through the microcomputer 4. As a result, even if required vehicle functions differ from vehicle to vehicle, a vehicular electronic control apparatus, which has a specific function required for such a vehicle type, can be configured by selecting and connecting to the mother unit 2 the ECU module, which corresponds to the required function.

For example, in case of a vehicle, which requires no seat control, it is only necessary to detach the third ECU module 30 having the seat control function for configuring a vehicular electronic control apparatus 1a, which has no seat adjusting control function.

Since common parts can be used among a plurality of vehicle models, manufacturing cost can be reduced in comparison to a case that a vehicular electronic control apparatus is configured specifically to each vehicle model.

Since the microcomputer 4 of the mother unit 2 as well as the first to the third ECU modules 10, 20 and 30 can perform a plurality of controls, the configuration of the control system can be simplified. Since each ECU module is connected detachably, it can be readily replaced with a new one even when it fails.

The vehicular electronic control apparatus is not limited to the above-described embodiment but may be implemented in other different embodiments.

For example, although the first to the third ECU modules 10, 20 and 30, which perform the engine control, the body control and the seat control, respectively, are mounted on the mother unit 2, other ECU modules for performing other controls may be further mounted in correspondence to required functions. For example, ECU modules for performing indispensable controls such as brake control, steering control and headlight control and ECU modules for performing controls such as transmission control, parking assist control, environment monitor control, interior light control and airbag control may be selected and mounted on the mother unit in correspondence to various functions required by respective vehicle models.

Although the ECU module diagnosis and the backup control are performed for the first ECU module 10, which performs the engine control as well, such a diagnosis and backup control may be performed for an ECU module, which performs a safety control required for safe travel of a vehicle. Exemplary ECU modules are ECU modules, which respectively perform brake control, transmission control, steering control, airbag control and headlight control.

Although the high load-time operation processing of the first ECU module 10 for the engine control is shared by the second ECU module 20 for the body control, the arithmetic operation processing of an ECU module, which performs a control function requiring high processing capability at the high load-time processing, may be shared by an ECU module required to use only a relatively low processing capability, an ECU module having a small change in processing loads or the mother unit.

Although the detection signals of the various sensors 41 to 43 are inputted to the ECU modules through the mother unit 2, the sensors required for the control performed by the ECU module may be directly connected to such an ECU module to directly input the detection signals. Similarly, the output signals to actuators such as the throttle value 51 may be provided directly from each ECU module or through the mother unit 2.

What is claimed is:

1. A vehicular electronic control apparatus comprising:
a mother unit including a microcomputer;
a plurality of ECU modules mounted to the mother unit detachably for performing different controls for a vehicle, respectively;
an operation data communication section for communicating operation data, which the plurality of ECU modules uses in performing operation processing for the respective controls, with the microcomputer;
an alternative operation processing section for causing the communication section to transmit the operation data to at least one of the microcomputer and one ECU module of the plurality of ECU modules through the microcomputer, and for causing the microcomputer or the one ECU module, to which the operation data is transmitted, to perform alternative operation processing corresponding to at least a part of operation processing, which is to be executed by another ECU module of the plurality of ECU modules; and
an ECU load check section configured to check whether each of the plurality of ECU modules is in a high processing load state,
wherein the alternative operation processing section is configured to determine the another ECU module to be an ECU module, which is determined to be in the high processing load state, so that the alternative operation processing is performed by the at least one of the microcomputer and one ECU module in place of the ECU module determined to be in the high processing load state.

2. The vehicular electronic control apparatus according to claim 1, wherein:
the plurality of ECU modules except for at least a predetermined ECU module include respective processing sections for executing the operation processing; and
the alternative operation processing is the part of operation processing, which is to be executed by the another ECU module.

3. The vehicular electronic control apparatus according to claim 1, further comprising:
an operation check section configured to check whether each of the plurality of ECU modules is operating normally;
a processing stop section configured to stop the ECU module, which is determined to be failing to operate normally, from executing the operation processing; and
a notification section configured to provide a notification in the vehicle that the ECU module is failing to operate normally,
wherein the alternative operation processing is a part of the operation processing, which is to be executed by the ECU module determined to be failing to operate normally and to correspond to the another ECU module.

4. The vehicular electronic control apparatus according to claim 3, further comprising:
a backup operation processing section configured to cause at least one of the microcomputer and the one ECU module to execute operation processing for safety travel of the vehicle, when the ECU module for performing a safety control is determined to be failing to operate normally.

5. The vehicular electronic control apparatus according to claim 1, further comprising:
a park check section configured to check whether the vehicle is being parked;

an ECU stop section configured to stop at least one of the plurality of ECU modules from operating, when the vehicle is determined to be being parked; and a park-time alternative control section configured to cause at least one of the microcomputer and the one ECU module, which is other than the stopped ECU module, from performing a control, which is to be performed by the stopped ECU module while the vehicle is being parked, the stopped ECU module being corresponding to the another ECU module.

6. The vehicular electronic control apparatus according to claim 1, further comprising:

a data format conversion section configured to convert a data format of the operation data outputted from the another ECU module to a data format which is usable by the at least one of the microcomputer and the one ECU module, which executes the alternative operation processing.

7. The vehicular electronic control apparatus according to claim 1, wherein:

the microcomputer receives, as the operation data, a control program required to execute the part of operation processing from the another ECU module, and transmits the control program to the one ECU module so that the alternative operation processing is performed by the one ECU module according to the control program.

8. A vehicular electronic control apparatus comprising:

a mother unit including a microcomputer;

a plurality of ECU modules mounted to the mother unit detachably for performing different controls for a vehicle, respectively;

an operation data communication section for communicating operation data, which the plurality of ECU modules uses in performing operation processing for the respective controls, with the microcomputer;

an alternative operation processing section for causing the communication section to transmit the operation data to at least one of the microcomputer and one ECU module of the plurality of ECU modules through the microcomputer, and for causing the microcomputer or the one ECU module, to which the operation data is transmitted, to perform alternative operation processing corresponding to at least a part of operation processing, which is to be executed by another ECU module of the plurality of ECU modules;

an operation check section configured to check whether each of the plurality of ECU modules is operating normally;

a processing stop section configured to stop the ECU module, which is determined to be failing to operate normally, from executing the operation processing; and a notification section configured to provide a notification in the vehicle that the ECU module is failing to operate normally, wherein the alternative operation processing is a part of the operation processing, which is to be executed by the ECU module determined to be failing to operate normally and to correspond to the another ECU module.

9. A vehicular electronic control apparatus comprising:

a mother unit including a microcomputer;

a plurality of ECU modules mounted to the mother unit detachably for performing different controls for a vehicle, respectively;

an operation data communication section for communicating operation data, which the plurality of ECU modules uses in performing operation processing for the respective controls, with the microcomputer;

an alternative operation processing section for causing the communication section to transmit the operation data to at least one of the microcomputer and one ECU module of the plurality of ECU modules through the microcomputer, and for causing the microcomputer or the one ECU module, to which the operation data is transmitted, to perform alternative operation processing corresponding to at least a part of operation processing, which is to be executed by another ECU module of the plurality of ECU modules;

a park check section configured to check whether the vehicle is being parked;

an ECU stop section configured to stop at least one of the plurality of ECU modules from operating, when the vehicle is determined to be being parked; and a park-time alternative control section configured to cause at least one of the microcomputer and the one ECU module, which is other than the stopped ECU module, from performing a control, which is to be performed by the stopped ECU module while the vehicle is being parked, the stopped ECU module being corresponding to the another ECU module.

10. A vehicular electronic control apparatus comprising:

a mother unit including a microcomputer;

a plurality of ECU modules mounted to the mother unit detachably for performing different controls for a vehicle, respectively;

an operation data communication section for communicating operation data, which the plurality of ECU modules uses in performing operation processing for the respective controls, with the microcomputer;

an alternative operation processing section for causing the communication section to transmit the operation data to at least one of the microcomputer and one ECU module of the plurality of ECU modules through the microcomputer, and for causing the microcomputer or the one ECU module, to which the operation data is transmitted, to perform alternative operation processing corresponding to at least a part of operation processing, which is to be executed by another ECU module of the plurality of ECU modules; and a data format conversion section configured to convert a data format of the operation data outputted from the another ECU module to a data format which is usable by the at least one of the microcomputer and the one ECU module, which executes the alternative operation processing.

* * * * *